United States Patent
Inada

(10) Patent No.: US 7,539,087 B2
(45) Date of Patent: May 26, 2009

(54) OPTICAL DISK APPARATUS

(75) Inventor: Tsutomu Inada, Osaka (JP)

(73) Assignee: Funai Electric Co., Ltd. (JP)

( * ) Notice: Subject to any disclaimer, the term of this patent is extended or adjusted under 35 U.S.C. 154(b) by 504 days.

(21) Appl. No.: 11/090,595

(22) Filed: Mar. 28, 2005

(65) Prior Publication Data

US 2005/0219972 A1    Oct. 6, 2005

(30) Foreign Application Priority Data

Apr. 5, 2004    (JP) ............................. 2004-110951

(51) Int. Cl.
    *G11B 7/00* (2006.01)
(52) U.S. Cl. .................... 369/44.11; 720/672
(58) Field of Classification Search ........................ None
    See application file for complete search history.

(56) References Cited

U.S. PATENT DOCUMENTS

| | | | | |
|---|---|---|---|---|
| 4,545,003 A | * | 10/1985 | Hirano et al. ................. | 369/43 |
| 4,641,296 A | * | 2/1987 | Mizunoe et al. ........... | 369/44.23 |
| 2003/0031116 A1 | * | 2/2003 | Takeda et al. ................ | 369/283 |
| 2005/0088927 A1 | * | 4/2005 | Tada et al. ................ | 369/44.28 |
| 2005/0162999 A1 | * | 7/2005 | Yamashita ................ | 369/44.34 |
| 2008/0068959 A1 | * | 3/2008 | Saito ........................ | 369/53.19 |

FOREIGN PATENT DOCUMENTS

| | | |
|---|---|---|
| JP | 06-301989 | 10/1994 |
| JP | 11-259876 | 9/1999 |

* cited by examiner

*Primary Examiner*—Joseph H Feild
*Assistant Examiner*—Parul Gupta
(74) *Attorney, Agent, or Firm*—Bacon & Thomas, PLLC

(57) ABSTRACT

The present invention provides an optical disk apparatus adapted to irradiate a predetermined track reliably with a laser beam in a seeking operation independently of the individual differences between tracking actuators and therefore optical pickups. A signal adjusting circuit 57 of a servo driver circuit 5 consists of a first amplifier 571 adapted to receive a period error signal that indicates the difference between a target period and a detection period and then output a reference drive signal having a prescribed amplitude in accordance with the difference, and a second amplifier 572 adapted to adjust the reference drive signal by being multiplied by the inverse number of a servo gain G which is different for each optical pickup 1. This allows the reference drive signal adjusted in accordance with the characteristics of a tracking actuator 12 of the optical pickup 1 to be input to a tracking drive signal generating circuit 58.

4 Claims, 2 Drawing Sheets

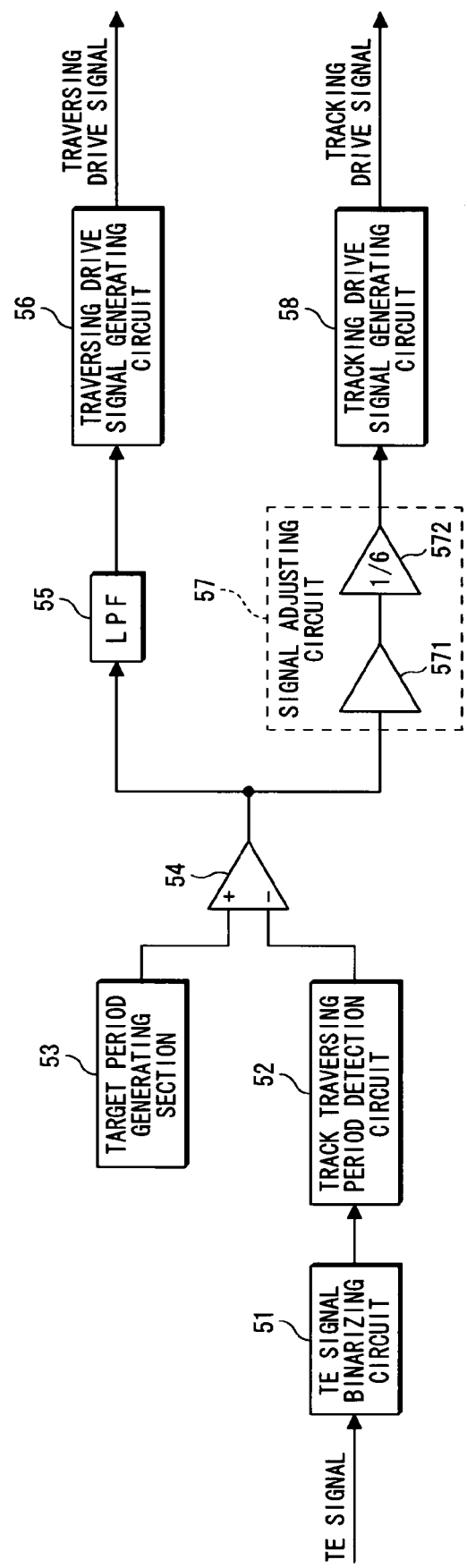

OPTICAL DISK APPARATUS

BACKGROUND OF THE INVENTION

1. Field of the Invention

The present invention relates to a tracking and traversing control technique for an optical disk apparatus.

2. Description of the Prior Art

In an optical disk apparatus, while rotating an optical disk such as a CD or a DVD, an optical pickup irradiates the recording surface of the optical disk with a laser beam and receives a reflected light from the recording surface of the optical disk to read out data optically. The optical pickup of such an optical disk apparatus comprises a focusing actuator for moving the focus of a laser beam irradiated on the optical disk in the optical axis direction, and a tracking actuator for moving the laser beam in the radial direction of the optical disk. The optical disk apparatus also comprises a traversing mechanism for moving the optical pickup to a predetermined position on the recording surface of the optical disk, and performs a so-called seeking operation, where a laser beam is irradiated on a predetermined position on the recording surface of the optical disk by controlling the tracking actuator and the traversing mechanism. In a seeking operation, the optical disk apparatus is adapted to calculate the moving speed of the optical pickup based on the frequency with which the optical pickup traverses tracks and to control the moving speed to be a predetermined speed, where a method of detecting and feeding back the moving speed in a seeking operation for acceleration and deceleration control is frequently used as an example (refer to Japanese Patent Laid-Open Publication No. Hei 6-301989 for example). In such an optical disk apparatus, if the moving speed is slower than the predetermined speed, an acceleration control is applied to the tracking actuator and the traversing mechanism, while if the moving speed is faster than the predetermined speed, a deceleration control is applied to the tracking actuator and the traversing mechanism. Then, in the acceleration and deceleration control, a drive signal prescribed in accordance with the difference in speed is applied to spindle motors, respectively, in the tracking actuator and the traversing mechanism.

However, since optical pickups are constructed by assembling a plurality of electronic and optical components and thereby include individual differences by necessity, and tracking actuators also include individual differences due to the characteristics of coils, magnets, etc., in the case of applying a specific drive signal to a tracking actuator as in the above-mentioned prior art example, the amount of movement differs for each tracking actuator. That is, due to the characteristics of coils, magnets, etc., the ratio of the magnitude of a force that acts on a coil to an applied voltage value differs for each tracking actuator. This suffers from a trouble in that in the case of a tracking actuator in which a larger force is applied to a coil with respect to the applied voltage value, the position of laser beam passes by a desired position when the specific drive signal is applied, while in the case of a tracking actuator in which a smaller force is applied to a coil with respect to the applied voltage value, the position of laser beam does not reach a desired position even when the specific drive signal is applied.

SUMMARY OF THE INVENTION

Accordingly, an object of the present invention is to provide an optical disk apparatus adapted to irradiate a predetermined track reliably with a laser beam in a seeking operation independently of the individual differences between tracking actuators and therefore optical pickups.

The present invention provides an optical disk apparatus comprising: an optical pickup for irradiating an optical disk with a laser beam through an objective lens; a tracking actuator for shifting the objective lens in the radial direction of the optical disk; a traversing means for moving the optical pickup in the radial direction of the optical disk; a tracking error signal generating means for outputting a tracking error signal generated based on the reflected light of a laser beam irradiated on the optical disk; and a servo driver for driving the tracking actuator and the traversing means based on the tracking error signal, wherein the servo driver outputs a drive signal corrected in accordance with the electromagnetic induction sensitivity of the tracking actuator to the tracking actuator.

In the arrangement above, when the tracking error signal is input, the servo driver outputs the drive signal corrected in accordance with the electromagnetic induction sensitivity of the tracking actuator, that is, the ratio that indicates how much the tracking actuator shifts laser beam in the radial direction of the recording surface of the optical disk in accordance with an applied signal. Using thus corrected drive signal allows a signal most suitable for shifting laser beam to a predetermined position to be applied to the tracking actuator.

Also, the servo driver of the optical disk apparatus according to the present invention is characterized by setting the amount of correction of the drive signal based on the amount of gain adjustment for the optical pickup.

In the arrangement above, based on the fact that the electromagnetic induction sensitivity of the tracking actuator has the same characteristic change as the amount of gain adjustment for the optical pickup that is obtained in a normal reproducing operation, outputting the drive signal corrected by the amount of correction based on the amount of gain adjustment for the optical pickup allows a signal most suitable for shifting laser beam to a predetermined position to be applied to the tracking actuator.

Further, the servo driver of the optical disk apparatus according to the present invention is characterized by correcting the drive signal by being multiplied by the inverse number of the amount of gain adjustment.

In the arrangement above, based on the concrete fact that the amount of correction depends on the inverse number of the amount of gain adjustment, outputting the drive signal corrected by multiplying a prescribed reference drive signal by the inverse number of the amount of gain adjustment for the optical pickup allows a signal most suitable for shifting laser beam to a predetermined position to be applied to the tracking actuator.

In accordance with the present invention, the individual differences between tracking actuators in the electromagnetic induction sensitivity can be eliminated by applying the drive signal, which is corrected by multiplying a prescribed reference drive signal by the inverse number of the amount of gain adjustment for the optical pickup that is obtained in a normal reproducing operation, to the tracking actuator. It is thus possible to provide an optical disk apparatus adapted to irradiate a predetermined track reliably with a laser beam in a seeking operation independently of the individual differences between tracking actuators and therefore optical pickups.

BRIEF DESCRIPTION OF THE DRAWINGS

FIG. 2 is a block diagram showing the schematic configuration of a part related to a tracking and traversing speed control in a servo driver circuit 5 shown in FIG. 1.

DESCRIPTION OF THE PREFERRED EMBODIMENTS

Figure 1:
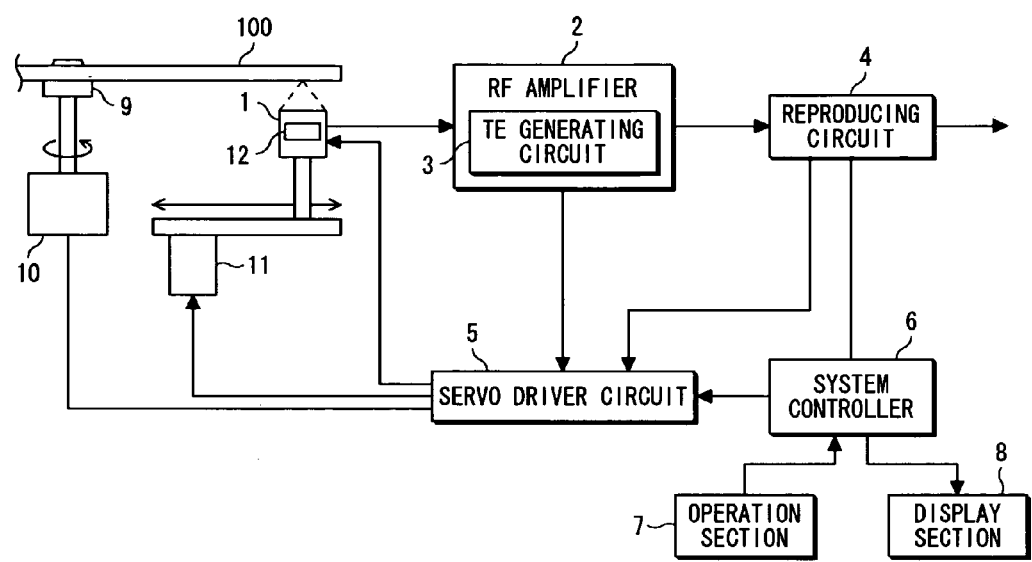
FIG. 1 is a block diagram showing the schematic configuration of an optical disk apparatus according to the present invention.

An optical disk apparatus according to an embodiment of the present invention will hereinafter be described with reference to FIGS. 1 and 2.

FIG. 1 is a block diagram showing the schematic configuration of the optical disk apparatus according to the present embodiment.

The optical disk apparatus comprises an optical pickup 1, an RF amplifier 2, a reproducing circuit 4, a servo driver circuit 5, a system controller 6, an operation section 7, a display section 8, a turntable 9, a spindle motor 10, and a stepping motor 11.

The optical pickup 1 comprises, though not shown in the figure, a laser diode, a collimator lens, a beam splitter, an objective lens, and a photodetector, and is adapted to irradiate an optical disk 100 with a laser beam from the laser diode and then convert a reflected light from the optical disk 100 into an electrical signal with the photodetector to read out information recorded on the optical disk 100 optically. The photodetector comprises, for example, four approximately evenly divided light receiving regions, and is adapted to output electrical signals from the respective four light receiving regions to the RF amplifier 2. The optical pickup 1 also comprises a focusing actuator (not shown in the figure) for moving the focus of a laser beam irradiated on the optical disk 100 in the optical axis direction, and a tracking actuator 12 for moving the laser beam in the radial direction of the optical disk 100. The focusing actuator comprises a focusing coil with an axial direction corresponding to approximately the optical axis direction across the objective lens and a permanent magnet for applying a magnetic field in the direction perpendicular to the axis of the coil, and is adapted to move the objective lens in the optical axis direction by applying a current (focusing drive signal) to the focusing coil in a predetermined direction. The tracking actuator 12 comprises tracking coils with an axial direction corresponding to the direction perpendicular to the optical axis across the objective lens and a permanent magnet for applying a magnetic field in the direction perpendicular to the axis of the coils, and is adapted to move the objective lens in the direction perpendicular to the optical axis, that is, in the radial direction of the optical disk 100 by applying a current (tracking drive signal) to the tracking coils in a predetermined direction. Thus applying the focusing control and the tracking control allows a laser beam to follow a desired recording track and the laser beam to be focused on the recording track.

The RF amplifier 2 amplifies the signal read by the optical pickup 1 and then outputs to the reproducing circuit 4, and further generates a focusing error signal (FE signal) in a focusing error signal generating circuit (not shown in the figure), while generates a tracking error signal (TE signal) in a tracking error signal generating circuit 3 (hereinafter referred to as "TE generating circuit") and then outputs to the servo driver circuit 5. The TE generating circuit 3 calculates, for example, the sum of output signals A and C from one diagonal pair of regions of the photodetector as well as the sum of output signals B and D from the other diagonal pair of regions thereof, and generates a signal that indicates the phase difference between the two sum signals (A+C) and (B+D) as a tracking error signal TE, and then amplifies the signal by a prescribed amplification factor to output to the servo driver circuit 5.

The reproducing circuit 4 performs demodulation processing, error detection and correction processing, etc. for the signal output from the RF amplifier 2 to reproduce the information. In addition, the reproducing circuit 4 generates a signal that indicates the rotation speed of the optical disk 100 from the signal output from the RF amplifier 2 and then outputs to the servo driver circuit 5.

Based on the FE signal and the TE signal output from the RF amplifier 2, the servo driver circuit 5 generates a focusing drive signal for turning the value of the FE signal to 0 (reference level), and a tracking drive signal and a traversing drive signal for turning the value of the TE signal to 0 (reference level). In addition, based on the signal, which indicates the rotation speed of the optical disk 100, output from the reproducing circuit 4, the servo driver circuit 5 generates a spindle motor drive signal for turning the rotation speed of the optical disk 100 to a target value. Then, the servo driver circuit 5 drives the focusing actuator in the optical pickup 1 based on the focusing drive signal, while drives the tracking actuator 12 based on the tracking drive signal. In addition, the servo driver circuit 5 drives the stepping motor 11 provided in the traversing mechanism for moving the optical pickup 1 in the radial direction of the optical disk 100 based on the traversing drive signal, while drives the spindle motor 10, which is adapted to rotate the turntable 9 for mounting the optical disk 100 thereon at a predetermined rotation speed, based on the spindle motor drive signal.

The operation section 7 is adapted to allow users to input various commands to the optical disk apparatus. Commands input by users to the optical disk apparatus are to be output to the system controller 6.

The display section 8 displays information that indicates the operation state of the optical disk apparatus, information related to data under reproduction, etc.

The system controller 6, which is composed of, for example, a microcomputer, is adapted to control each component of the optical disk apparatus in accordance with commands input by users to the optical disk apparatus.

Meanwhile, the optical disk apparatus has to be in such a manner that the speed of the optical pickup 1 is maintained to be constant in a seeking operation as described in the above-mentioned prior art. Hence, the optical disk apparatus according to the present invention employs the configuration shown in FIG. 2 and is adapted to control as follows.

FIG. 2 is a block diagram showing the schematic configuration of a part related to a tracking and traversing speed control in the servo driver circuit 5 shown in FIG. 1.

The tracking and traversing speed control section of the servo driver circuit 5 comprises a TE signal binarizing circuit 51, a track traversing period detection circuit 52, a target period generating section 53, an amplifier 54, an LPF 55, a traversing drive signal generating circuit 56, a signal adjusting circuit 57, and a tracking drive signal generating circuit 58.

The TE signal binarizing circuit 51 converts the TE signal input from the TE generating circuit 3 into a binarized TE signal having a rectangular waveform and then outputs to the track traversing period detection circuit 52. The track traversing period detection circuit 52 detects a track traversing period by detecting a pulse repetition period of the binarized TE signal and then outputs a detection period signal. At the same time, the target period generating section 53 outputs a target period indicating signal that indicates a target period set and stored based on a desired tracking moving speed. The amplifier 54 receives the target period indicating signal and the detection period signal, and then outputs a period error signal that indicates the difference between the target period and the detection period. The period error signal is input to the signal adjusting circuit 57 as well as the traversing drive signal generating circuit 56 through the LPF 55.

The traversing drive signal generating circuit 56 generates a traversing drive signal having a predetermined amplitude based on the period error signal, and then outputs to the stepping motor 11. To be move concrete, when it is detected based on the period error signal that the detection period is longer than the target period, a traversing drive signal having an amplitude larger than one prescribed when the detection period is equal to the target period and depending on the difference between the detection period and the target period is output. On the contrary, when it is detected based on the period error signal that the detection period is shorter than the target period, a traversing drive signal having an amplitude smaller than that prescribed when the detection period is equal to the target period and depending on the difference between the detection period and the target period is output. Varying the rotation speed of the stepping motor 11 in accordance with the amplitude of the tracking drive signal allows the speed of the optical pickup 1 to be changed so as to move at the target period.

The signal adjusting circuit 57 consists of first and second amplifiers 571 and 572. The first amplifier 571 outputs a reference drive signal having an amplitude prescribed independently of the individual differences between apparatuses based on the period error signal input from the amplifier 54. To be more concrete, when it is detected based on the period error signal that the detection period is longer than the target period, the first amplifier 571 outputs a reference drive signal having an amplitude larger than one prescribed when the detection period is equal to the target period and depending on the difference between the detection period and the target period. On the contrary, when it is detected based on the period error signal that the detection period is shorter than the target period, the first amplifier 571 outputs a reference drive signal having an amplitude smaller than that prescribed when the detection period is equal to the target period and depending on the difference between the detection period and the target period.

The second amplifier 572 adjusts the amplitude of the reference drive signal input from the first amplifier 571 in accordance with the gain G of the optical pickup 1, and then outputs to the tracking drive signal generating circuit 58. To be more concrete, the second amplifier 572 multiplies the input reference drive signal by the inverse number (1/G) of the gain G, that is, amplifies the reference signal by 1/G and then outputs the signal. The gain G is generally used to read out information recorded on the optical disk 100 using the optical pickup 1 and reproduce the information using the reproducing circuit 4, where the optical disk apparatus performs the read-out and reproduction of information under an optimum condition by adjusting the gain G. Then, since the gain G depends on the optical pickup 1, another optical pickup 1 has a different gain G.

Thus adjusting the reference drive signal with a gain G, which is different for each optical pickup, and then outputting the signal allows a signal according to each optical pickup mounted to be output to the tracking drive signal generating circuit 58.

The tracking drive signal generating circuit 58 generates a tracking drive signal having an amplitude depending on the adjusted reference drive signal, and then outputs to the tracking actuator 12 of the optical pickup 1. The tracking actuator 12 varies the moving speed of the objective lens, in accordance with the tracking drive signal, to be a predetermined speed. Here, the tracking actuator 12 has a different electromagnetic induction sensitivity in accordance with the individual difference of the gain of the optical pickup 1. Thus applying the tracking drive signal adjusted in accordance with the individual differences between optical pickups as mentioned above allows the effect of the difference between electromagnetic induction sensitivities due to the individual differences to be cancelled and thereby the objective lens to be moved reliably at the predetermined speed.

Employing the above-described arrangement can provide an optical disk apparatus adapted to irradiate a predetermined track reliably with a laser beam in a seeking operation independently of the individual differences between tracking actuators and therefore optical pickups.

It is noted that the above-mentioned embodiment shows the case where the signal adjusting circuit 57 is composed of the first and second amplifiers 571 and 572 separately, which may be integrated. That is, the signal adjusting circuit 57 is only required to output a signal, which is adjusted in such a manner as to cancel the individual differences between optical pickups in accordance with an input period error signal, to the tracking drive signal generating circuit 58.

What is claimed is:

1. An optical disk apparatus comprising:
an optical pickup for irradiating an optical disk with a laser beam through an objective lens;
a tracking actuator for shifting said objective lens in the radial direction of said optical disk according to a drive signal, the tracking actuator having an electromagnetic induction sensitivity which corresponds an actual amount of movement of the objective lens for a given signal applied to the tracking actuator;
a traversing means for moving said optical pickup in the radial direction of said optical disk;
a tracking error signal generating means for outputting a tracking error signal generated based on the reflected light of a laser beam irradiated on said optical disk; and
a servo driver for driving said tracking actuator and said traversing means based on said tracking error signal,
wherein said servo driver outputs a drive signal to said tracking actuator, the drive signal being based on said tracking error signal and a multiplier which is the inverse of a gain adjustment corresponding to the electromagnetic induction sensitivity of said tracking actuator.

2. An optical disk apparatus comprising:
an optical pickup for irradiating an optical disk with a laser beam through an objective lens;
a tracking actuator for shifting said objective lens in the radial direction of said optical disk according to a drive signal, the tracking actuator having an electromagnetic induction sensitivity which indicates an amount of movement of the objective lens corresponding to a signal applied to the tracking actuator;
a traversing means for moving said optical pickup in the radial direction of said optical disk;
a tracking error signal generating means for outputting a tracking error signal generated based on the reflected light of a laser beam irradiated on said optical disk; and
a servo driver for driving said tracking actuator and said traversing means based on said tracking error signal,
wherein said servo driver inputs said tracking error signal and outputs a drive signal to said tracking actuator based on said tracking error signal and a correction value, the correction value corresponding to the electromagnetic induction sensitivity of said tracking actuator.

3. The optical disk apparatus according to claim 2, wherein said servo driver sets the correction value based on an amount of gain adjustment for said optical pickup.

4. The optical disk apparatus according to claim 3, wherein said servo driver corrects said drive signal by being multiplied by the inverse number of the amount of gain adjustment.

* * * * *